Patented Jan. 7, 1947

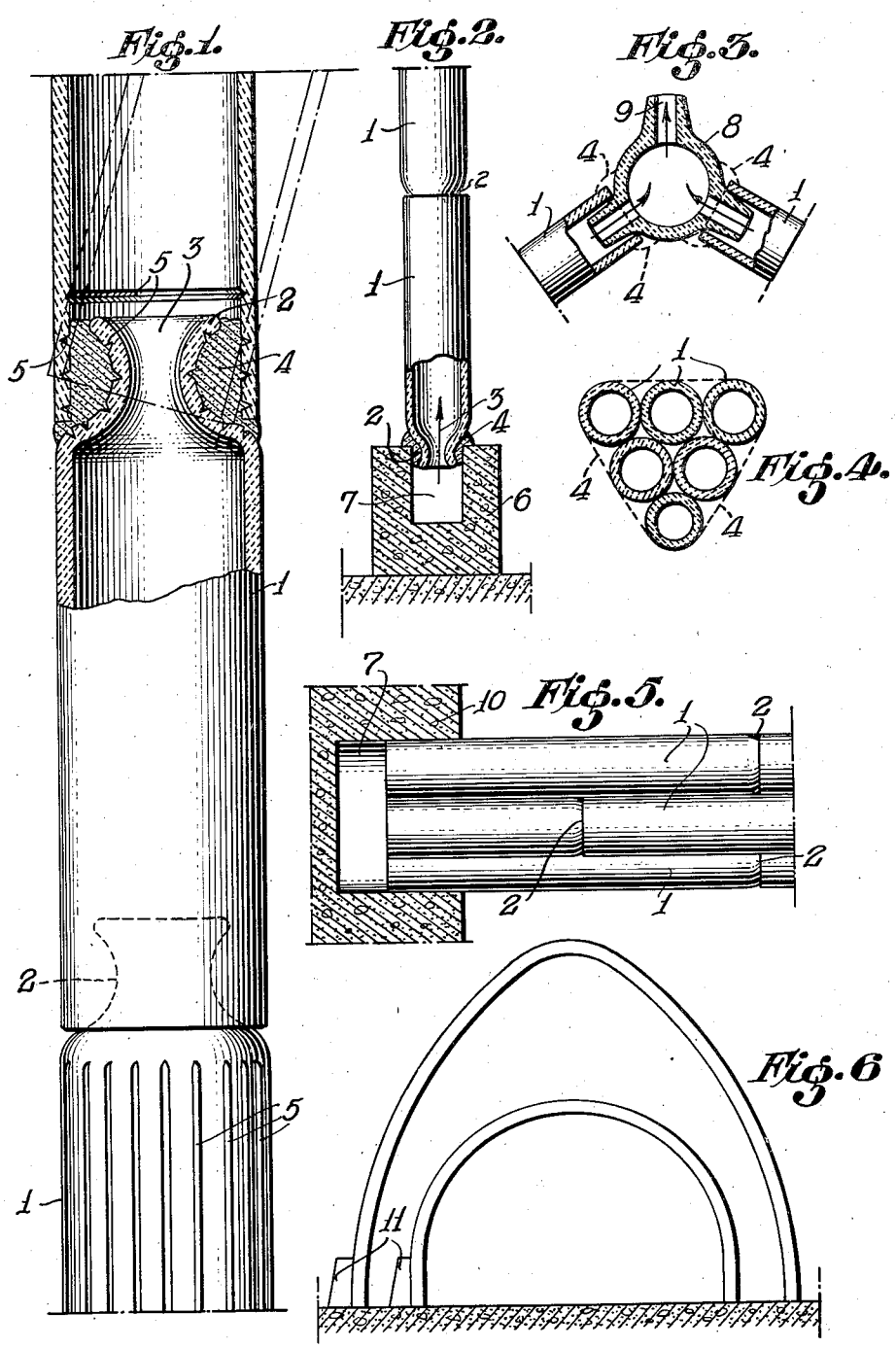

2,413,690

UNITED STATES PATENT OFFICE 2,413,690

TUBULAR STRUCTURAL ELEMENT

Jacques Couëlle, Marseille, France; vested in the Alien Property Custodian

Application February 26, 1942, Serial No. 432,393
In France November 22, 1941

2 Claims. (Cl. 287—54)

This invention relates to improvements in lightweight tubular building elements made of such materials as clay or the like, and the primary object of the invention is to provide tubular elements of this character which are adaptable to more universal application in the construction of buildings of various types.

Another important object of the invention is to provide improved tubular elements of the character indicated which can be arranged as conduits for heated or cooled air whereby the walls or other portions of a building in which the elements are incorporated can be heated or cooled by the circulation of air therethrough.

Other important objects and advantages of the invention will be apparent from the following detailed description and the accompanying drawing, wherein for illustration only, preferred embodiments of the invention are set forth.

In the drawing:

Figure 1 is a side elevation on an enlarged scale showing assembly of several tubular elements in accordance with this invention, a portion of joined elements being broken away to show the joint therebetween.

Figure 2 is a sectional and elevational view on a reduced scale showing an adaptation of the invention.

Figure 3 is a fragmentary transverse sectional view showing conjunction of several tubular elements with a ridge element in another arrangement according to this invention.

Figure 4 is a transverse section taken through a beam composed of several of the tubular elements arranged as a bundle.

Figure 5 is a sectional and side elevational view showing an end of the beam of Figure 4 mounted in a receiving opening in a support member.

Figure 6 is a schematic view showing two forms of building construction to which the tubular elements of the present invention are adaptable.

Referring in detail to the drawing, the tubular element 1 is made preferably of clay, provided on its upper end with a bell-mouthed collar 2, whose orifice 3 provides communication between conjoined tubular elements, as indicated in Figure 1 of the drawing.

By reason of the exterior shape of the collar 2, its insertion in the plain end of a tubular element provides an annular space adapted to receive the joining material 4 so as to form a "bamboo" joint. The same annular spacing permits the elements to be solidly joined together at different angles to their axes, as indicated by dotted lines in Figure 1 of the drawing, as well as in axial alignment. This enables use of the tubular elements in many constructions to which such elements have not heretofore been well adapted.

In order to increase the adhesion to the tubular elements 1 of joining material or of plaster or the like, the exterior of the elements may be provided with locking grooves 5, which may extend in different directions and have profiles suited to the use and environment of the tubular elements.

In the arrangement of Figure 2 of the drawing, the collar 2 on the lower end of the element 1 is inserted in the opening of a socket like base 6 of preferably masonry material, the base having a duct 7 communicating with said opening and with the opening 3 through the collar 2. The duct 7 is connected with a source (not shown) of either hot or cold air, as may be desired, whereby the tubular elements 1 in the circuit either radiate or absorb heat.

The hot or cold air escapes by way of the tubular ridge elements 8, shown in Figure 3, which is provided with radial nipples to be inserted in the plain ends of the tubular elements 1, and with other upper radial nipples 9 open to the atmosphere. Suitable covering means for the upper nipples 9 may be provided to exclude rain or other matter. However, should rain enter the circuit it will drain to the base duct 7.

It will be understood that the shape of the collar 2 with the resulting reduction in diameter characterizing the orifice 3, provides for Venturi acceleration of the flow of air from the base duct 7 to the ridge outlet nipple 9, whereby the heating or cooling efficiency of the tubular elements 1 is enhanced.

The tubular elements 1 described herein may be used, particularly when made of ceramic material, for the formation of tubular beams, as shown in Figures 4 and 5. In these figures, the socket base 6 is shown replaced by a socketed wall 10 provided with a duct 7 and supportably receiving the beam. By similar arrangement the walls, ceilings, floors, and partitions of buildings may be heated or cooled in accordance with requirements.

It is obvious that application of the tubular elements of the present invention is not limited to the construction of ordinary buildings, such as dwellings, silos, factories, bridges, tunnels and the like, but that these elements associated as disclosed herein may be used to form protective conduits for cables, pipes, and the like, as well as to form gas condensers and other industrial and domestic apparatus, with relatively small cost for labor and material.

From the foregoing specification it will be apparent that the structure according to the present invention is usable wherever structural members and building materials are required. Accordingly, in the claims it is contemplated that the term "structural member" shall include walls, floors, ceilings, beams, studs, joists and the like.

Having thus described my invention, what I desire to secure by Letters Patent and claim is:

1. A structural member comprising a vertical load supporting member composed of at least one tubular element comprising at least two sections arranged in end abutting relation, the abutted ends of the sections comprising a plain tubular cylindrical end portion formed integral on one of the sections and a reduced diameter hour-glass shaped end portion formed integral on the other section and inserted into said plain cylindrical end portion whereby the terminal edge of said plain cylindrical end portion supportably rests on the larger diameter areas of said hour-glass shaped portion in either a coaxial or a tilted relationship of the sections, and the smaller diameter areas of the hour-glass shaped portions are substantially and concentrically spaced from the interior of the plain cylindrical end portions, and a mass of mortar or the like filling the space between the exterior of the hour-glass shaped portion and the interior of the plain cylindrical end portion whereby the said sections are fixed together.

2. A structural member according to claim 1, wherein one end of said vertical member is connected in communication with an air conduit to receive air therefrom for discharge at the other end of said vertical member, the hour-glass shaped portion present in said vertical member then acting as a venturi with respect to air flowing through said vertical member.

JACQUES COUËLLE.